United States Patent [19]

Pechter et al.

[11] Patent Number: 4,918,587
[45] Date of Patent: Apr. 17, 1990

[54] PREFETCH CIRCUIT FOR A COMPUTER MEMORY SUBJECT TO CONSECUTIVE ADDRESSING

[75] Inventors: Richard G. Pechter, Escondido; Ronald Selkovitch, Ramona; Quoanh W. Tsy; William C. Woolf, both of San Diego, all of Calif.

[73] Assignee: NCR Corporation, Dayton, Ohio

[21] Appl. No.: 131,602

[22] Filed: Dec. 11, 1987

[51] Int. Cl.⁴ .............................................. G06F 12/00
[52] U.S. Cl. ................... 364/200; 364/263.1; 364/246.4; 364/243; 364/966.3; 364/964.33
[58] Field of Search ....................... 364/200, 900, 468

[56] References Cited

U.S. PATENT DOCUMENTS

| | | | |
|---|---|---|---|
| 3,931,613 | 1/1976 | Gruner et al. | 364/200 |
| 4,095,265 | 6/1978 | Vrba | 364/200 |
| 4,424,561 | 1/1984 | Stanley et al. | 364/200 |
| 4,583,162 | 4/1986 | Prill | 364/200 |
| 4,621,320 | 11/1986 | Holste et al. | 364/200 |
| 4,652,993 | 3/1987 | Scheumeman et al. | 364/200 |
| 4,661,900 | 4/1987 | Chen et al. | 364/200 |

FOREIGN PATENT DOCUMENTS 0165822 12/1985 Japan.

OTHER PUBLICATIONS

IBM Technical Disclosure Bulletin, vol. 26, No. 7B, Dec. 1983, pp. 3941-3944.

*Primary Examiner*—Gareth D. Shaw
*Assistant Examiner*—Gopal C. Ray
*Attorney, Agent, or Firm*—Wilbert Hawk, Jr.; Casimer K. Salys

[57] ABSTRACT

A computer memory prefetch architecture for accelerating the rate at which data can be accessed from memory and transmitted to a processor when successive addresses are numerically consecutive. Upon the identification of a consecutive address sequence, the succession of real addresses are generated directly by a counter. The memory of the computer system is partitioned into odd and even banks which are selectively addressed using the odd and even segments of the address generated in the counter. Output data from each memory bank is stored in a corresponding register operable to transmit the data entered therein during a previous memory address cycle while the anticipated next address data is written into the other register. The prefetch architecture may be meaningfully used to accelerate the access rate of a memory shared by multiple processors.

3 Claims, 4 Drawing Sheets

PREFETCH CIRCUIT FOR A COMPUTER MEMORY SUBJECT TO CONSECUTIVE ADDRESSING

BACKGROUND OF THE INVENTION

The present invention relates to digital computer systems, and more particularly to a architecture for rapidly accessing data stored in memory.

The evolution of computer system processors has produced a number of refinements which accelerate the rate at which such processors can execute instructions. As a consequence, the delays associated with fetching consecutive instructions from memory have become the primary factor which limit the computer system processing speeds. The delays commonly attributable to fetching instruction data from memory are further exacerbated when multiple processors are configured to access data resident in the same memory. Such problems have become major data processing limitations for contemporary dyadic type processor systems.

Analyses of the memory accessing operations performed by processors have identified that significant segments of the memory accessing operations are used to obtain processor instruction data which follows an ordered address sequence, to the extent that large groups of instructions are commonly resident in memory at sequentially incremented addresses.

In recognition of this ordered arrangement of instruction data addresses, individuals practicing in the technology have developed design refinements which anticipate the existence of sequences and perform anticipatory operations to accelerate memory accessing. An example of such technology appears in U.S. Pat. No. 4,583,162, where a look ahead memory interface is described. The interface according to such patent anticipates the next address to be generated by the processor and then transmits the anticipated address to the memory as soon as access is authorized. The objective is to reduce the memory access time by eliminating memory addressing transients. No data is fetched from the memory based upon the next predicted address. Furthermore, access to the memory by other users, for example, a second processor, is thus foreclosed. Clearly, such interface is likely to result in a net loss of processor capability in any multiple processor computer system.

A somewhat more related arrangement is described in U.S. Pat. No. 4,621,320, where the memory is partitioned and the prefetching is based upon an anticipated address sequence. The prefetched data is stored in a register and conveyed to the processor only after the processor completes a address comparison between the actual succeeding address and the anticipated address represented by the prefetched data. The prefetching, however, in the context of this invention, is only done with reference to one bank of the memory. Consequently, memory access performance gains are minimal. Furthermore, the invention in this patent degrades when used in the context of a multiple processor shared memory computer system because of address translation delays and the need for more bank refresh cycles.

Both the above noted patents compare addresses to determine whether the anticipated next address corresponds to that actually generated by the processor. An inherent deficiency of such arrangements are the time delays associated with the translations of the addresses from their virtual to their real form in the comparison operation.

Accordingly, there exists a need for a memory accessing architecture suitable for operation with multiple processors and virtual addresses characterized by ordered address sequences.

SUMMARY OF THE INVENTION

The present invention defines a memory configuration and memory access architecture which accelerates the rate at which data in memory can be accessed by one or more processors. Numerically successive address data is prefetched and stored in registers for immediate access. Address translation preparatory to comparison is avoided. For the particular arrangement selected, the time associated with fetching a successively arranged set of instructions from the memory has been reduced from three processor clock cycles down to two processor clock cycles in all but the first cycle.

As embodied, the computer system employs a dual port, two bank word interleaved memory, with the memory banks individually identified as the even memory bank and the odd memory bank. During the first address cycle both memory banks are simultaneously addressed, one bank provides data directly to the processor as the other bank provides the prefetched data to be stored in a register for the next successive and anticipated address cycle. Successive and consecutive address cycles alternate from bank to bank and between corresponding registers.

More particularly, during the first prefetch operation, data from the even bank of the memory is transmitted to the processor concurrent with a prefetch of the data for the next consecutive address from the odd memory bank, the odd data thereupon being stored in an odd data related register. The first prefetch is a three clock cycle operation. Thereafter, for consecutive memory address cycles, real memory addresses are derived from a counter and used directly to prefetch next consecutive memory data for storage in one register while the data previously prefetched and stored in the other register is immediately transmitted to the processor. The time coincidence of such prefetching and transmission of data significantly accentuates the rate at which sequentially addressed data is converged from the memory to the processor.

These and other features of the invention will be more fully appreciated by considering the detailed description which follows.

DETAILED DESCRIPTION OF THE INVENTION

Figure 1:
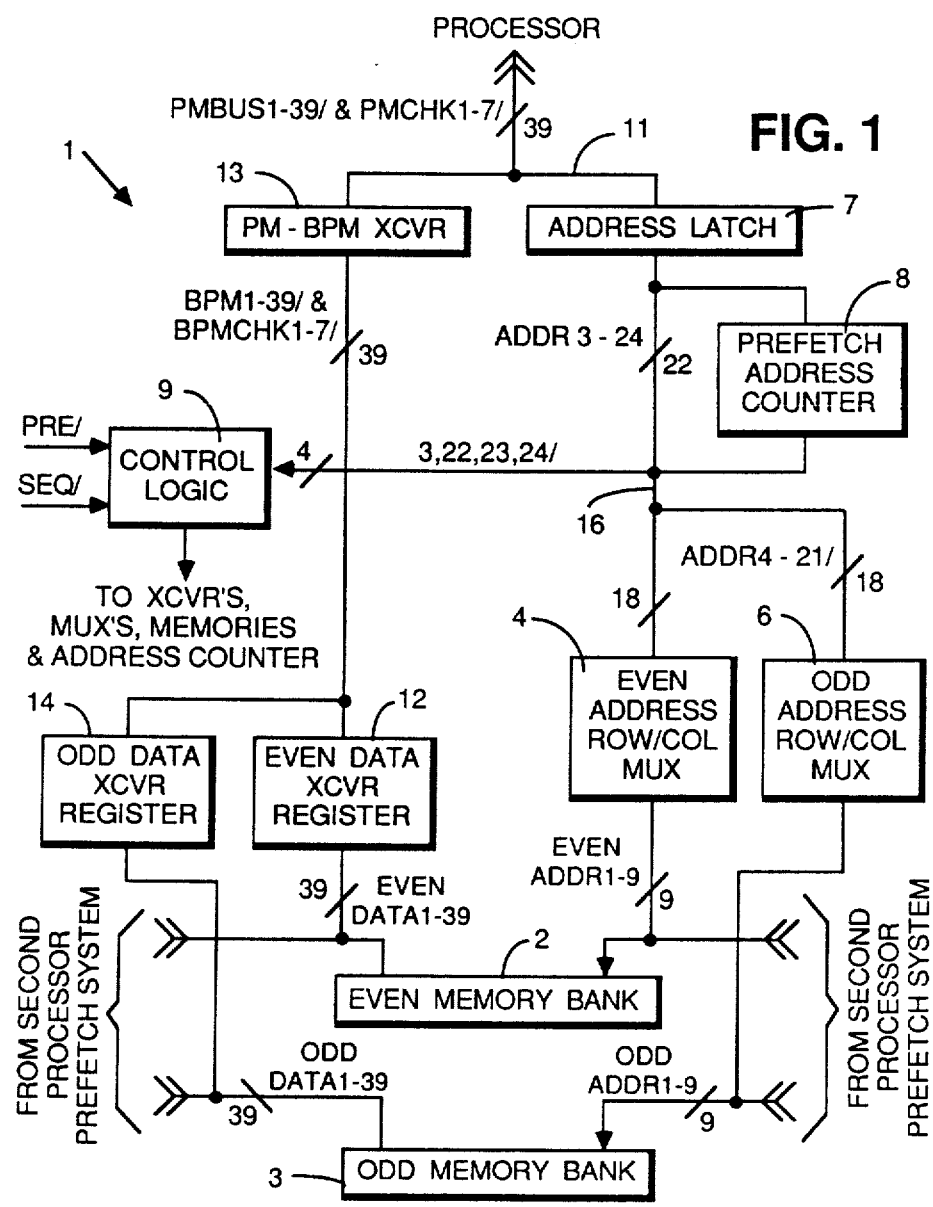
FIG. 1 is a schematic block diagram illustrating the functional elements of the present invention.

Attention is now directed to FIG. 1 of the drawings, where the invention is illustrated by way of block diagrams. The single processor prefetch architecture 1 is shown connected to a split memory, comprised of an even memory bank 2, accessed by evenly numbered addresses, and an odd memory bank 3, accessed by odd numbered addresses. For this arrangement, the even numbered addresses are conveyed as row and column words from even address multiplexer 4. Odd address multiplexer 6 is similarly arranged to provide either row or column addresses to odd memory bank 3. Memory address data is received from the processor on processor bus 11, latched into address latch 7, and selectively entered into prefetch address counter 8. The even and odd addresses used by multiplexers 4 and 6 are simultaneously taken from bus 16. Bus 16 is driven either by address latch 7 or by prefetch address counter 8, depending on the operating mode during the time interval in question.

For first prefetch operations, the row/column addresses originate in address latch 7. Thereafter, during consecutive prefetch operations, the row/column addresses originate in prefetch address counter 8. The address entered into prefetch address counter during the first prefetch is incremented by clocking signals generated in control logic block 9. Prefetch address counter 8 is incremented at the conclusion of each memory access operation in anticipation of a consecutive prefetch operation for the next memory access. Note that control logic block 9 also regulates the sequence of the row/column address multiplexers 4 and 6.

Output data from even memory bank 2 is selectively latched and retransmitted by even data transceiver register 12, through transceiver 13, and onto processor bus 11. The data from complementary odd address memory bank 3 is similarly latched into odd data transceiver register 14 for selective transmission through transceiver 13 to processor bus 11. Even data transceiver register 12 and odd data transceiver register 14 operate in the alternative. The operations of even data transceiver register 12, odd data transceiver register 14, and transceiver 13 are responsive to control signals generated in logic block 9.

Control logic block 9 receives control data signals from bus 16 and the pair of master control signals PRE/ and SEQ/. Signals PRE/ and SEQ/ are generated by the processor to identify the operational sequence which control logic block 9 must particularized. The presence of a PRE/ signal alone indicates that the ensuring address sequence is to be a first prefetch operation, with an associated three clock cycle duration for the present embodiment. The presence of both the PRE/ and the SEQ/ signals indicates that the next memory address is numerically consecutive to the previous memory address. For such a consecutive prefetch condition, the prefetch data previously stored in data transceiver register 12 or 14 is transmitted directly to processor bus 11 in time coincidence with an addressing of opposite memory bank by the consecutively next address from the corresponding mux 4 or 6. The data from the memory bank so addressed is stored in the corresponding data transceiver register as the next prefetch data.

According to a preferred implementation of the architecture in FIG. 1, the first prefetch operation addresses the even memory bank 2 in response to an even address latched into address latch 7 and conveyed via even address row/column multiplexer 4. The first prefetch data so addressed is immediately transmitted through even data transceiver register 12 and onto processor bus 11. In time coincidence with such even memory bank addressing cycle, the odd memory bank is addressed using a compensated address in odd address row/column multiplexer 6. The data from odd memory bank 3 is stored in odd data transceiver register 14. The prefetch address counter is then incremented. This first prefetch operation extend over three clock cycles.

If the next address generated by the processor is consecutive, the processor activates both the PRE/ and SEQ/ signals. The data previously stored in odd data transceiver register 14 is provided immediately to processor bus 11 in time coincidence with an addressing of even memory bank 2, using a real address generated in prefetch address counter 8, and the storage of the prefetched even data in even data transceiver register 12. This consecutive prefetch operation only extends over two clock cycles.

It should be recognized that the first prefetch operation responds to a virtual address, which address must be translated before reaching the real address state entered into address latch 7. Although such translator is not individually shown, it is a recognized element of any advanced computer memory accessing system. In contrast, the next consecutive address generated by prefetch address counter 8 is a real memory address. A delay of one clock cycle is typical for address translation.

The gain in addressing speed attributable to the direct use of a real address during a consecutive prefetch operation is complemented on the memory data transmission side of the architecture by the use of data transceiver registers 12 and 14. Memory data prefetched during the previous address cycle, based upon an anticipated next address, is immediately available for transmission via transceiver 13 to processor bus 11.

Address latch 7 and prefetch address counter 8 are operable in the alternative. Multiplexers 4 and 6 multiplex the row addresses and the column addresses in response to a conventional strobed memory access state machine, not shown.

The embodiment depicted in FIG. 1 shows 39 data lines emanating from each memory bank, through transceivers 12, 13 and 14, and onto processor bus 11. The content of such lines includes thirty-two data bits and seven error correction and detection bits.

Figure 2:
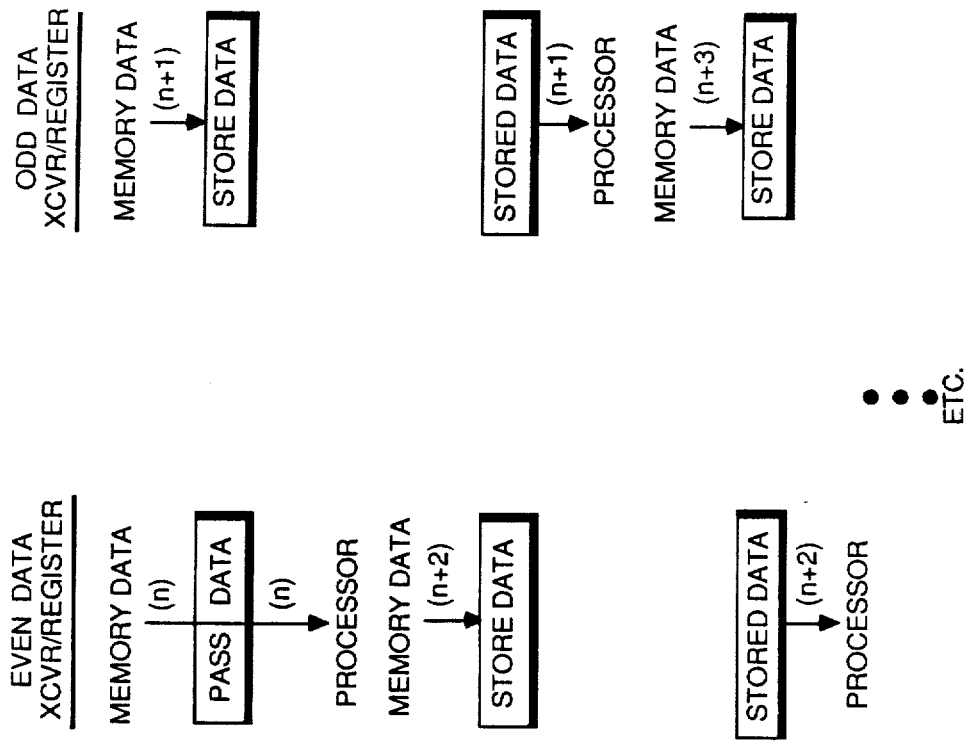
FIG. 2 is a diagram schematically portraying the operational flow of data in accordance with the first prefetch and subsequent consecutive prefetch cycles.

The movement of memory resident data for a consecutive sequence of addressing operations is conceptually depicted in FIG. 2 of the drawings. The sequence of n to n+3 represents four consecutively addressed words accessed by the processor. Note that during the first prefetch operation, the even address memory data word n is passed directly to the processor concurrent with storage of the next, n+1, odd memory data word in the even register. For the next and consecutive prefetch operation, the data previously stored in the even register is passed to the processor coincident with a direct and real addressing of the even memory bank for the n+2 data word. The n+2 data word is stored in the even register. The addressing and storage alternates similarly for all consecutive prefetch operations at the two clock rate.

Figure 3:
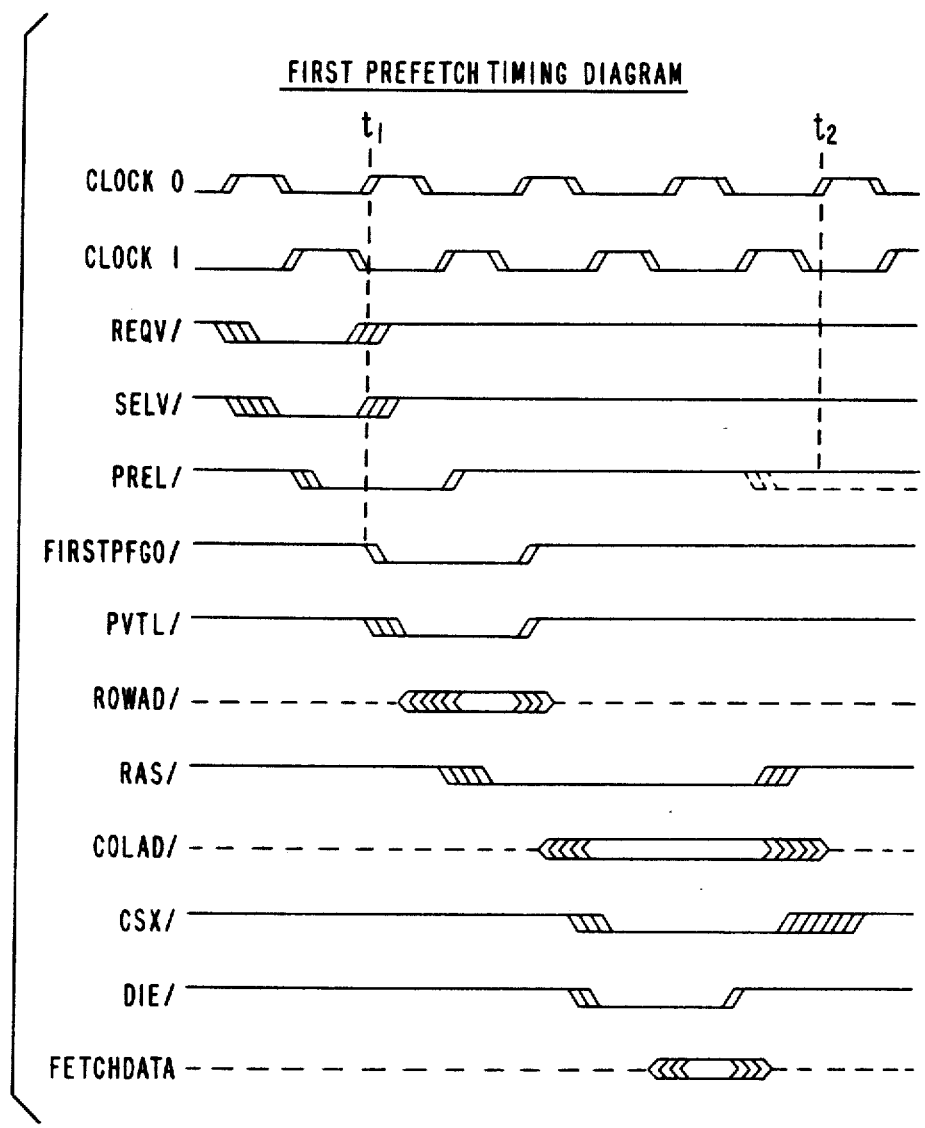
FIG. 3 is a schematic timing diagram for a first prefetch operation.

FIG. 3 illustrates the timing relationships of the important signal controlling the block diagram embodiment in FIG. 1 during the first prefetch operation. Clocks 0 and 1 are the processor clocks. The REQV/ signal generated by the processor activates control logic 9, by requesting access to processor bus 11. Access is acknowledged by the grant signal SELV/. The presence of the PREL/ signal (a latched PRE/), and the concurrent absence of the SEQL/ signal, initiates control logic 9 into the first prefetch operating sequence.

The commencement of the first prefetch sequence by control logic 9 is indicated by the FIRSTPFGO/ signal. For purposes of reference, the onset of this signal may be considered the start of the three clock cycle sequence during which the processor is to access memory. A PVTL/ signal is generated to notify the address translator device, which converts virtual addresses to real row and column addresses suitable to access memory banks 2 and 3, that processor address translation is required.

The sequencing and timing of the multiplexers 4 and 6 to first generate a row address identified as ROWAD/, followed by a row strobe RAS/, and thereafter by a multiplexed column address COLAD/, and a corresponding column strobe CSX/, are under the control of a memory state machine commonly used to access computer memory systems. It should be recognized that the trailing edges of the RAS/, COLAD/, and CSX/ signals are not suppressed as early as otherwise possible by virtue of the three clock cycle duration available to perform the overall first prefetch operation. These signals are precisely terminated in the consecutive prefetch operation of FIG. 4 in recognition of the shorter two clock cycle time allotted to that operation.

The remaining signals depicted in FIG. 3 are the DIE/ signal, which indicate the completion of the memory cycle, and the FETCHDATA signal, indicating the transmission of the accessed data onto the processor bus by transceiver 13.

Figure 4:
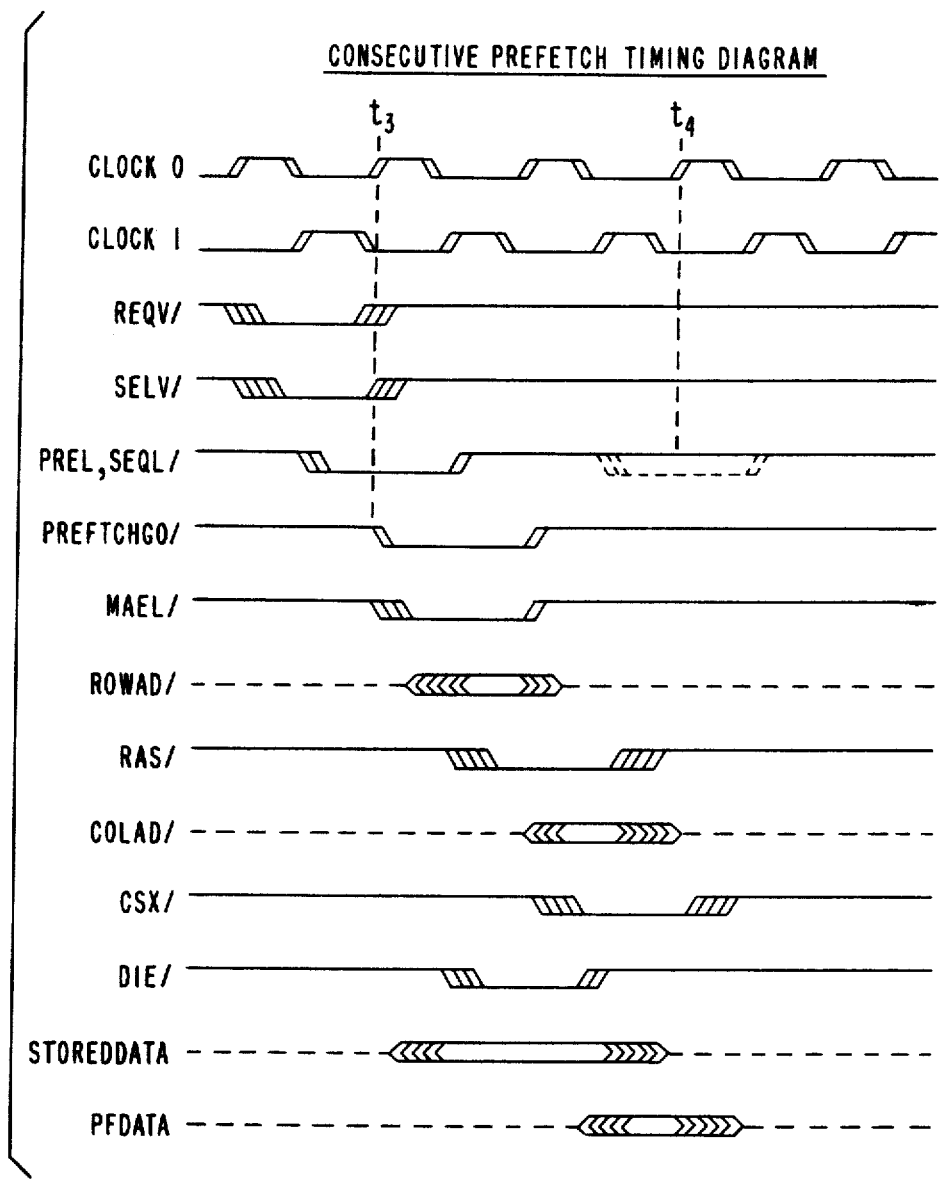
FIG. 4 is a schematic timing diagram for a consecutive prefetch operation.

Timing diagrams for representative signals used in a consecutive prefetch operation are depicted in FIG. 4. The clock 0, clock 1, REQV/ and SELV/ signals are unchanged from their representations in the first prefetch operating sequence of FIG. 3. Note, however, the concurrent presence of the PREL/ and SEQL/ signals, to identify that the ensuing prefetch sequence, is to be the consecutive version. Control logic 9 then generates a PREFETCHGO signal to indicate the start of the two clock cycle prefetch, the exact sequence of the memory cycle being defined as noted previously by the memory access state machine. Coincident with the start of the memory state machine, a MAEL/ signal is transmitted to the translator portion of the processor. The MAEL/ notifies the translator of the transmission of a real address not requiring translation.

The memory addressing is commenced as shown by the succession of row addresses ROWAD/, column addresses COLAD/, and corresponding strobes RAS/ and CSX. In the consecutive prefetch operating sequence, the RAS/, COLAD/ and CSX/ are more abrupt than their counterparts in FIG. 3 because of the shortened two clock cycle overall duration. Again, there appears a DIE/ signal to indicate the impending completion of memory addressing itself. Also shown in the timing diagram is a STOREDDATA signal, depicting the interval during which prefetched data previously stored in a data transceiver register is available for transmission onto the processor bus.

The PFDATA signal illustrate the interval during which the prefetched data addressed in memory is available for latching into one of the data transceiver registers.

The reduction in the memory access cycle time from a convention memory access operation, generally represented by the first prefetch with a three clock cycle span between event $t_1$ and $t_2$, is clearly evident when the times are compared to those of the consecutive prefetch operation extending for two clock cycles between corresponding time intervals $t_3$ and $t_4$. Times $t_2$ and $t_4$ identify the first clock interval suitable to initiate succeeding memory access operations.

Where memory data is accessed in pages, the processor must identify the transition across a page boundary and initiate a new first prefetch operation. Again, it is preferred that the first prefetch commence with an even address.

Directing attention back to FIG. 1, note that the architecture there depicted is amenable to operate in a system where the memory banks 2 and 3 are shared by multiple processors. For example, a second processor could be connected to the address and data output lines of banks 2 and 3 at the identified locations. The second processor system would have to include a set of registers, multiplexers, control logic, counters, latches and transceivers comparable to those identified as blocks 4, 6, 7, 8, 9, 12, 13 and 14 in FIG. 1. The first prefetch and consecutive prefetch timing waveforms would have two sets of PREL/ and SEQL/ signals, one for each processor. Of course, in such context, contention logic would be added to insure that only one processor were addressing the memory at during a defined interval of time. The DIE/ signal would then be used to convey information about the availability of signals from memory. A further refinement of such dyadic processor architecture would include arbitration logic to allow both processors to access the memory simultaneously so long as the accesses were directed to opposite banks.

As now shown, the present architecture reduces the memory access time from the typical three clock cycles to an operation involving but a mere two clock cycles for memory data of consecutive address location. The architecture features the use of a two bank memory with alternating prefetches and internally generated real addresses for prefetch accessing of the memory. Foremost, the architecture is not susceptible to immediate and major degradation when used in a multiple processor environment, in that each processor includes its own prefetch architecture.

It will be understood by those skilled in the art that the embodiment as set forth hereinbefore are merely exemplary of various elements and procedures which are essential to the present invention, and such may be replaced by equivalents without departing from the invention hereof, which now will be defined by the appended claims.

We claim:

1. An apparatus for accelerating the rate that consecutively addressed data in a partitioned computer memory is furnished to a processor in the computer, comprising:

an addressable memory array having an even address bank and an odd address bank;

a processor bus;

an address latch connecting the processor bus to both the even and the odd banks of the memory array;

means connected between said latch and said address banks for receiving a first address from said latch and for consecutively indexing said first address to consecutively address the even and odd banks of the memory array;

an even transceiver register connected between the even bank of the memory array and the processor bus;

an odd transceiver register connected between the odd bank of the memory array and the processor bus; and means responsive to a consecutive addressing command signal from the processor for enabling a first of said registers to provide data to the processor bus in time coincidence with addressing, by said indexing means, the memory array bank corresponding to a second of said registers and for enabling said second register to latch data from such corresponding memory array bank.

2. The apparatus recited in claim 1, wherein the means for enabling includes:

means for transmitting data directly from one bank of the memory array to the processor bus and from the other bank of the memory array to the corresponding data register, in response to said first address from said latch received by one of said memory banks in time coincidence with a compensated address received by the other of said memory banks.

3. The apparatus recited in claim 2, wherein the means for consecutively indexing address data is an address counter, connected selectively to address either bank of the memory array.

* * * * *